US012710764B2

(12) United States Patent
Kim

(10) Patent No.: US 12,710,764 B2
(45) Date of Patent: Aug. 18, 2026

(54) OPTIMAL PATH PLANNING DEVICE AND METHOD FOR DRONES CONSIDERING OBSTACLES

(71) Applicant: NEARTHLAB INC., Seoul (KR)

(72) Inventor: Young Joo Kim, Seoul (KR)

(73) Assignee: NEARTHLAB INC., Seoul (KR)

( * ) Notice: Subject to any disclaimer, the term of this patent is extended or adjusted under 35 U.S.C. 154(b) by 59 days.

(21) Appl. No.: 18/852,830

(22) PCT Filed: Oct. 18, 2023

(86) PCT No.: PCT/KR2023/016205
§ 371 (c)(1),
(2) Date: Sep. 30, 2024

(87) PCT Pub. No.: WO2024/117539
PCT Pub. Date: Jun. 6, 2024

(65) Prior Publication Data

US 2025/0224734 A1 Jul. 10, 2025

(30) Foreign Application Priority Data

Nov. 30, 2022 (KR) ........................ 10-2022-0164814

(51) Int. Cl.
*G05D 1/644* (2024.01)
*G05D 1/622* (2024.01)
(Continued)

(52) U.S. Cl.
CPC ............. *G05D 1/644* (2024.01); *G05D 1/622* (2024.01); *G05D 2105/89* (2024.01); *G05D 2109/20* (2024.01)

(58) Field of Classification Search
CPC .... G05D 1/644; G05D 1/622; G05D 2109/20; G05D 2105/89
See application file for complete search history.

(56) References Cited

U.S. PATENT DOCUMENTS 11,164,464 B1 * 11/2021 Marriott .................. G08G 5/21
2015/0370251 A1 * 12/2015 Siegel ...................... B64D 1/22
701/2
(Continued)

FOREIGN PATENT DOCUMENTS

KR 10-2020-0061665 A 6/2020
KR 10-2021-0121595 A 10/2021
(Continued)

OTHER PUBLICATIONS

International Search Report issued in PCT/KR2023/016205; mailed Jan. 30, 2024.

*Primary Examiner* — Naeem Taslim Alam
(74) *Attorney, Agent, or Firm* — Studebaker Brackett PLLC

(57) ABSTRACT

A optimal path planning device for drones, comprises: a first graph generation module configured to generate a first graph by setting a plurality of nodes in a predetermined area based on obstacle information and industrial structure information for the predetermined area, and by setting edges that connect each of the nodes; a second graph generation module configured to generate a second graph related to selected inspection object edges among a plurality of edges, a third graph generation module configured to generate a third graph with an Eulerian path based on the generated second graph, and a final path determination module configured to determine an optimal path of the drone based on the total cost of the generated third graph.

13 Claims, 15 Drawing Sheets

(51) Int. Cl.
*G05D 105/80* (2024.01)
*G05D 109/20* (2024.01)

(56) References Cited

U.S. PATENT DOCUMENTS

| | | | | |
|---|---|---|---|---|
| 2016/0107749 | A1* | 4/2016 | Mucci | B64C 39/024 701/3 |
| 2017/0221394 | A1* | 8/2017 | Garcia Morchon | G09F 19/18 |
| 2021/0124376 | A1* | 4/2021 | Edara | G06Q 10/063 |
| 2022/0300870 | A1* | 9/2022 | Kim | G05D 1/0027 |

FOREIGN PATENT DOCUMENTS

| | | |
|---|---|---|
| KR | 10-2431247 B1 | 8/2022 |
| KR | 10-2431251 B1 | 8/2022 |
| KR | 10-2500345 B1 | 2/2023 |

* cited by examiner

Figure 1:
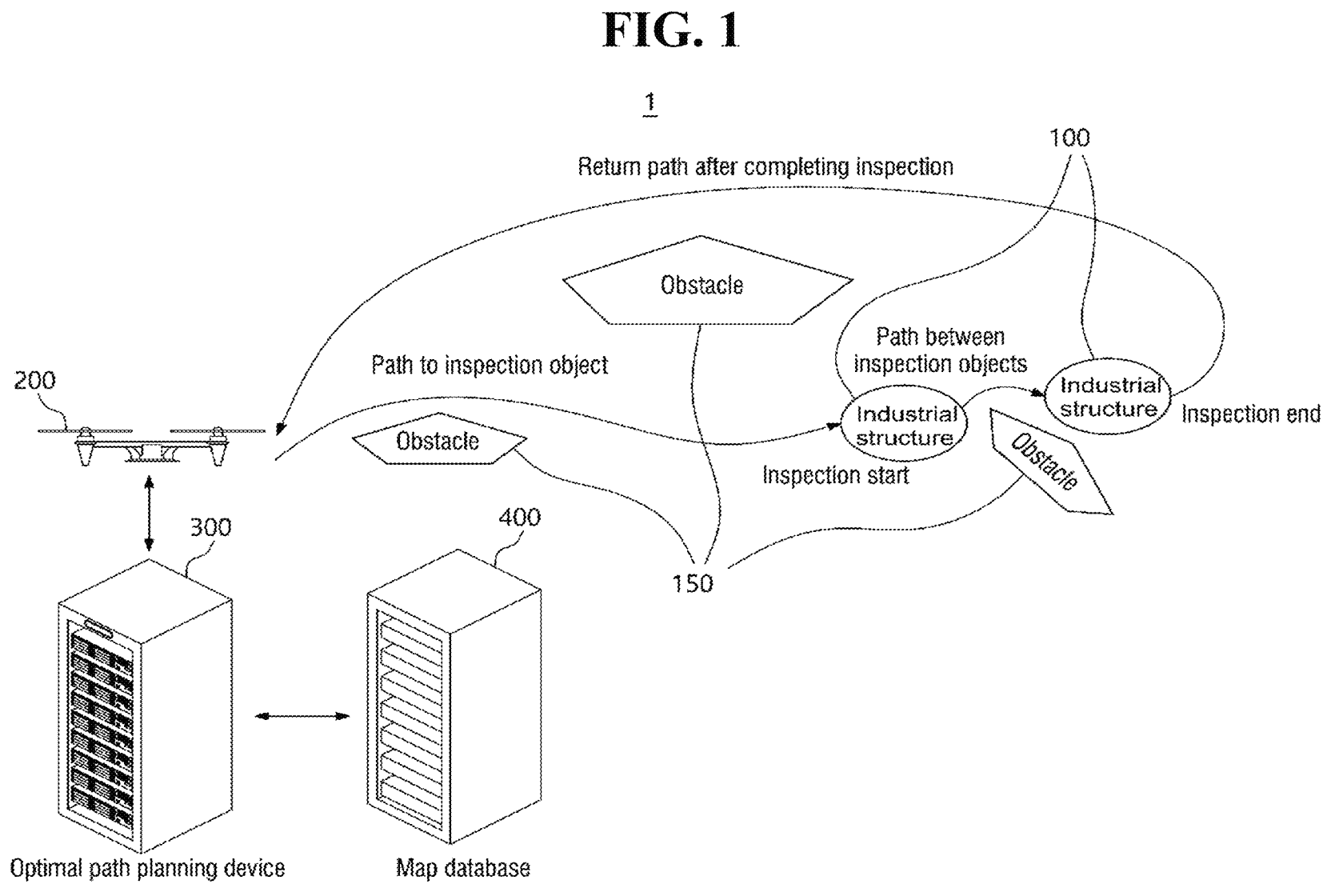

Return path after completing inspection

Path to inspection object

Path between inspection objects

Industrial structure

Industrial structure

Inspection start

Inspection end

Obstacle

Obstacle

Obstacle

100

150

200

300

400

Map database

Optimal path planning device

FIG. 5c

AG
AE
IE1
IE2
IE3
IE4
IE5
IE6
AN
Start
start
End
end

OPTIMAL PATH PLANNING DEVICE AND METHOD FOR DRONES CONSIDERING OBSTACLES

CROSS-REFERENCE TO RELATED APPLICATION

The present disclosure is a national phase application under 35 U.S.C. § 371 of International Application No. PCT/KR2023/016205 filed Oct. 18, 2023, which claims the benefit of and priority to Korean Patent Application No. 10-2022-0164814 filed Nov. 30, 2022, the contents of which being incorporated by reference in their entireties herein.

TECHNICAL FIELD

The present invention relates to an optimal path planning device and method for drones considering obstacles.

Specifically, the present invention relates to an optimal path planning device and method for drones for planning the entire flight path of a drone by considering the location of obstacles, which the drone cannot approach, when setting the route of a drone inspecting industrial structures.

BACKGROUND

The content described in this section is merely background information related to the present embodiment and does not constitute prior art.

Recently, the technology of photographing using drones has been commercialized. Moreover, the technology of photographing using drones has been applied in various technical fields, and there has been an increasing need for defect detection systems utilizing AI to inspect industrial structures.

In the past, industrial structures were sometimes inspected manually, which required a large workforce and various equipment, and it posed problems of significant time and cost consumption. As a result, there has been a need to inspect the condition of industrial structures using drones instead.

Although technology for setting flight paths for inspecting industrial structures generally exists, the technology for setting the entire flight path, from the departure of the drone from a station to its return after inspecting the industrial structures, has not been commercialized. Thus, there is a need for research and development on the optimization technology for the entire flight path from the departure of the drone to its return.

When setting the entire flight path, obstacles may exist around the industrial structures that the drone cannot approach. Therefore, a path planning algorithm that considers such obstacles is required when establishing the entire flight path.

DETAILED DESCRIPTION

Technical Objective

The problem to be solved by the present invention is to provide an optimal path planning device for drones, which plans the entire flight path for inspecting industrial structures while considering obstacles.

Another problem to be solved by the present invention is to provide an optimal path planning method for drones, which plans the entire flight path for inspecting industrial structures while considering obstacles.

The objects of the present invention are not limited to those mentioned above, and other objects and advantages not explicitly mentioned will be understood through the following description and will become more apparent through the embodiments of the present invention. Moreover, it will be readily apparent that the objects and advantages of the present invention can be achieved by the means and their combinations presented in the claims.

SUMMARY

According to some aspects of the disclosure, a optimal path planning device for drones, comprises: a first graph generation module configured to generate a first graph by setting a plurality of nodes in a predetermined area based on obstacle information and industrial structure information for the predetermined area, and by setting edges that connect each of the nodes; a second graph generation module configured to generate a second graph related to selected inspection object edges among a plurality of edges, a third graph generation module configured to generate a third graph with an Eulerian path based on the generated second graph, and a final path determination module configured to determine an optimal path of the drone based on the total cost of the generated third graph, wherein the edges include cost information related to the movement of the drone between the corresponding two nodes, wherein the obstacle information includes topographical information of restricted areas that the drone cannot pass through, and wherein the industrial structure information includes topographical information of industrial structures to be inspected by the drone.

According to some aspects, the cost information includes at least one of the edge lengths connecting the corresponding nodes and the movement time of the drone between the corresponding nodes.

According to some aspects, the first graph generation module is configured to: set the nodes so that the nodes are not included in the obstacle information when setting the nodes, and set the edges so that at least a portion of the edges is not included in the obstacle information when setting the edges.

According to some aspects, the first graph generation module is configured to define the spatial information of each node when setting the nodes, wherein the spatial information includes at least one of the latitude, longitude, and altitude of each node.

According to some aspects, the second graph generation module includes: an inspection setting part configured to set an inspection start node and an inspection end node from among the plurality of nodes in the generated first graph; an edge selection part configured to select inspection object edges from among the plurality of edges in the first graph; a preliminary graph generation part configured to generate a preliminary graph including the inspection object edges and the nodes corresponding to the inspection object edges; and a post-processing part configured to post-process the preliminary graph into a connected graph and determine the post-processed preliminary graph as the second graph.

According to some aspects, the post-processing part generates an assistant graph based on the generated preliminary graph and post-processes the preliminary graph into the connected graph by adding the nodes and edges in the generated assistant graph to the preliminary graph without duplication.

According to some aspects, the post-processing part adds the nodes and edges present in the preliminary graph to the assistant graph, which initially starts as an empty graph, and for all node pairs in the assistant graph, if an edge connecting the two nodes does not exist in the assistant graph, sets auxiliary nodes and auxiliary edges in the assistant graph to connect the two nodes based on the first graph, wherein the auxiliary nodes and auxiliary edges are set in the assistant graph based on the shortest path between the two nodes identified in the first graph.

According to some aspects, the third graph generation module includes: a duplicate node identification part configured to identify duplicate nodes among the nodes of the second graph that do not satisfy predetermined Eulerian path conditions, and a supplement edge setting part configured to set supplement edges connecting the identified duplicate nodes and determine the second graph with the set supplement edges as the third graph.

According to some aspects, the supplement edge setting part sets the supplement edges based on the shortest path between the duplicate nodes searched in the first graph.

According to some aspects, the final path determination module compares the total cost of a plurality of third graphs generated by setting at least one of the inspection start node and inspection end node differently, and determines the third graph with the minimum total cost as the optimal path of the drone, wherein the total cost of the third graph is the sum of the cost information corresponding to all the edges included in the third graph.

Effect

The optimal path planning device and method of the present invention have the novel effect of being able to plan the entire flight path for inspecting industrial structures by considering the location of obstacles.

At this time, by considering the location of obstacles, not only can the specific inspection path for industrial structures be planned, but the entire flight path from the departure of the drone to its return can also be planned, optimizing of the entire flight process of the drone.

Furthermore, the optimal path planning device and method of the present invention have the novel effect of determining the optimal location of the drone station by deciding and comparing a plurality of inspection start and end points within a predetermined area.

In addition to the above, the specific effects of the present invention will be described in detail while explaining the specific matters for carrying out the invention.

BRIEF DESCRIPTION OF THE DRAWINGS

FIG. 1 illustrates an optimal path planning system for drones according to some embodiments of the present invention.

FIGS. 5*a* to 5*d* illustrate the process of generating the second graph according to some embodiments of the present invention.

BEST MODE

Figure 2:
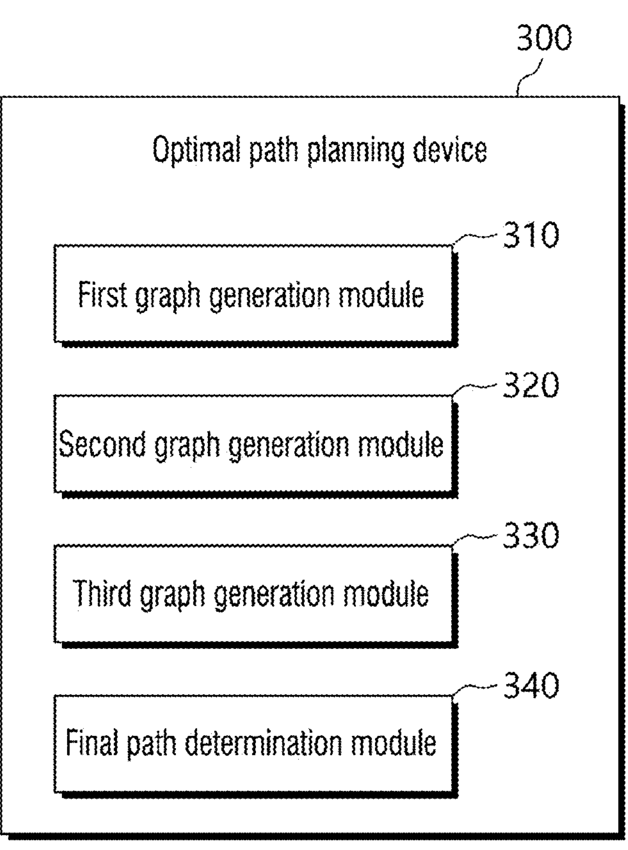
FIG. 2 is a block diagram of the optimal path planning device according to some embodiments of the present invention.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application.

In addition, each configuration, procedure, process, method, or the like included in each embodiment of the disclosure may be shared to the extent that they are not technically contradictory to each other.

Hereinafter, with reference to FIGS. 1 to 9, the optimal path planning device and method for drones according to some embodiments of the present invention will be described.

FIG. 1 illustrates an optimal path planning system for drones according to some embodiments of the present invention.

Referring to FIG. 1, the optimal path planning system for the drones 1 (hereinafter referred to as "optimal path planning system") according to some embodiments of the present invention is a system 1 for planning the entire flight optimal path of a drone 200 inspecting industrial structures 100. The system may include a drone 200 that photographs industrial structures 100, an optimal path planning device 300, and a map database 400.

The drone 200, optimal path planning device 300, and map database 400 included in the optimal path planning system may be connected through a communication network. Here, the communication network may include wireless and wired communication networks. Additionally, the communication network may be a local area network (e.g., Bluetooth, WiFi Direct, or IrDA (infrared data association), RF (Radio Frequency)) or a wide area network (e.g., cellular network, internet, or computer network (e.g., LAN or WAN)).

The drone 200 may fly around the industrial structure 100 according to control commands and may include a device for inspecting the condition of the industrial structure 100. The drone 200 may also be referred to as a UAV (Unmanned Aerial Vehicle).

The drone 200 may fly based on predetermined flight commands and/or control commands for flight or operation received from the optimal path planning device 300 regarding the industrial structure 100 and may photograph the industrial structure 100. In this case, a camera may be mounted on the drone 200 to photograph the industrial structure 100.

The industrial structure 100 inspected by the drone 200 may include, for example, power lines, utility poles, roads, bridges, pipelines, wind turbines, and the like, but the embodiments of the present invention are not limited to these examples.

The map database 400 may refer to a database that includes map information of each structure within a predetermined area. The map information stored in the map database 400 may encompass both private and public data, and the types of map information are not limited thereto. Although FIG. 1 illustrates the map database 400 as being external to the optimal path planning device 300, the map database 400 may also be included within the optimal path planning device 300.

The term "structure" may refer not only to the industrial structure 100 inspected by the drone 200 but also to obstacles 150 that are present along the flight path of the drone 200 and block its passage, as well as other buildings within a predetermined area. The map information may include information such as the location and altitude of each structure mentioned above, but the embodiments of the present invention are not limited thereto.

The obstacle 150 may refer to a restricted area that the drone cannot pass through. Restricted areas may include private homes, private property, and areas where entry and photography are legally prohibited, but the embodiments of the present invention are not limited to these examples.

In some examples, the map database 400 may store information regarding the industrial structure 100 inspected by the drone 200, as well as information about obstacles 150 that obstruct the passage of the drone 200, but the embodiments of the present invention are not limited thereto.

In this case, the industrial structure information may include topographical information about the relevant industrial structure 100, and the obstacle information may include topographical information about restricted areas where obstacles exist that prevent the drone from passing. The topographical information may include details such as the location and altitude of the structures, but the embodiments of the present invention are not limited thereto.

The optimal path planning device 300 may generate the movement path of the drone 200 for inspecting the industrial structure 100. The optimal path planning device 300 may generate the entire flight path from the departure point of the drone 200, through the completion of the inspection, to the return point.

In other words, the optimal path planning device 300 may generate the entire flight path of the drones, which includes the path from the station to the inspection object, the paths between a plurality of inspection objects, and the return path after completing the inspection (the path returning to the station) as shown in FIG. 1, but the embodiments of the present invention are not limited to this.

Although FIG. 1 illustrates that the drone 200 returns to the departure station after completing the inspection, the embodiments of the present invention are not limited to this, and as described later, the drone 200 may return to a different station from the departure station.

In some examples, the optimal path planning device 300 may generate the entire flight path as described above based on the industrial structure information about the industrial structure 100 and the obstacle information about the obstacles 150.

In some examples, the optimal path planning device 300 may generate the entire flight path by creating first to third graphs related to the movement path of the drone based on the industrial structure information and obstacle information as described above.

First, the optimal path planning device 300 may create a first graph by setting a plurality of nodes and edges within a predetermined area range based on the industrial structure information and obstacle information as described above.

Then, the optimal path planning device 300 may generate a second graph related to the selected inspection target edges among the edges included in the generated first graph.

Then, the optimal path planning device 300 may modify the generated second graph to have an Eulerian path, thereby generating the third graph.

Then, the optimal path planning device 300 may generate the optimal path of the drone 200 based on the comparison of the total costs of a plurality of third graphs generated by setting different inspection start nodes and inspection end nodes.

Hereinafter, the specific configuration of the optimal path planning device 300 within the optimal path planning system 1 will be explained in detail.

FIG. 2 is a block diagram of the optimal path planning device according to some embodiments of the present invention.

Referring to FIGS. 1 and 2, the optimal path planning device 300 may include a first graph generation module 310, a second graph generation module 320, a third graph generation module 330, and a final path determination module 340.

The first graph generation module 310 may generate a first graph related to the entire flight path, including the inspection path for the industrial structure 100.

The first graph generation module 310 may generate the first graph based on obstacle information and industrial structure information for a predetermined area.

The obstacle information may include topographical information of restricted areas where obstacles 150 exist, preventing the drone from passing, and the industrial structure information may include topographical information of the industrial structure 100. In this case, the topographical information may include at least one of location information and altitude information.

In other words, the obstacle information may include location information, altitude information, and the like for restricted areas, and the industrial structure information may include location information, altitude information, and the like for the industrial structure 100.

In some examples, the first graph generation module 310 may generate the first graph by setting the plurality of nodes and edges for the area range based on the obstacle information and industrial structure information for the predetermined area range.

At this time, when the first graph generation module 310 sets the plurality of nodes of the first graph, it may define the spatial information of each node. In this case, the spatial information may include the latitude, longitude, and altitude of each node, but the embodiments of the present invention are not limited to this. This is because the present invention utilizes the spatial relationship with the obstacle 150.

At this time, the edge may include cost information. The cost information may include information related to the movement of the drone between the corresponding two nodes. In some examples, the cost information may include the length of the edge connecting the corresponding nodes, the movement time of the drone between the corresponding nodes, and the like, but the embodiments of the present invention are not limited thereto. In this case, the movement time of the drone between the corresponding nodes may be an estimate generated based on the length between the nodes and a predetermined algorithm, but the embodiments of the present invention are not limited thereto.

The nodes and edges set by the first graph generation module 310 may be classified into target nodes and target edges corresponding to the industrial structure 100, and other nodes and other edges.

Hereinafter, a process of generating the first graph will be explained in more detail with reference to FIGS. 3*a* to 3*c*.

Figure 3A:
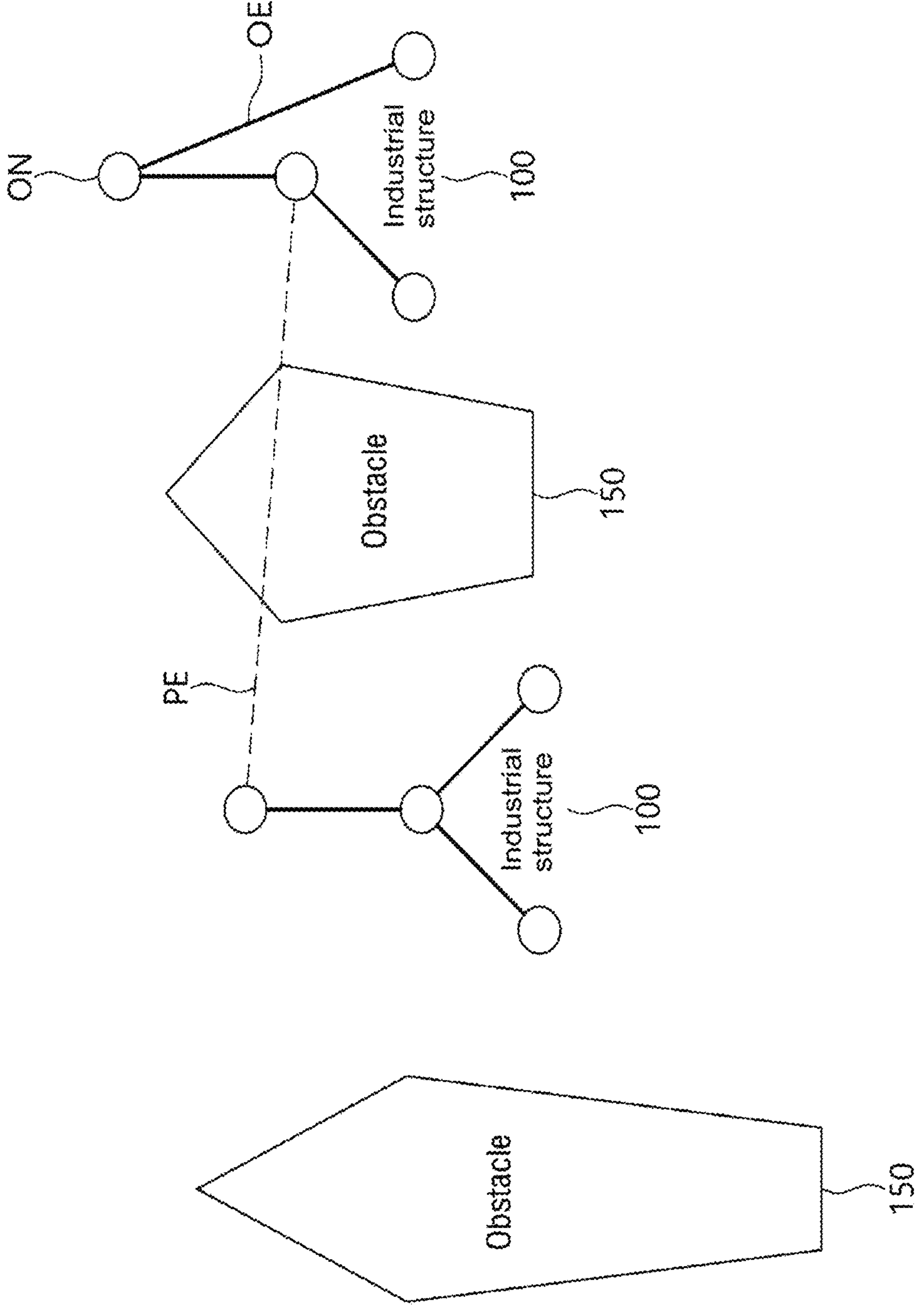
FIGS. 3*a* to 3*c* illustrate the process of generating the first graph according to some embodiments of the present invention.
Figure 3B:
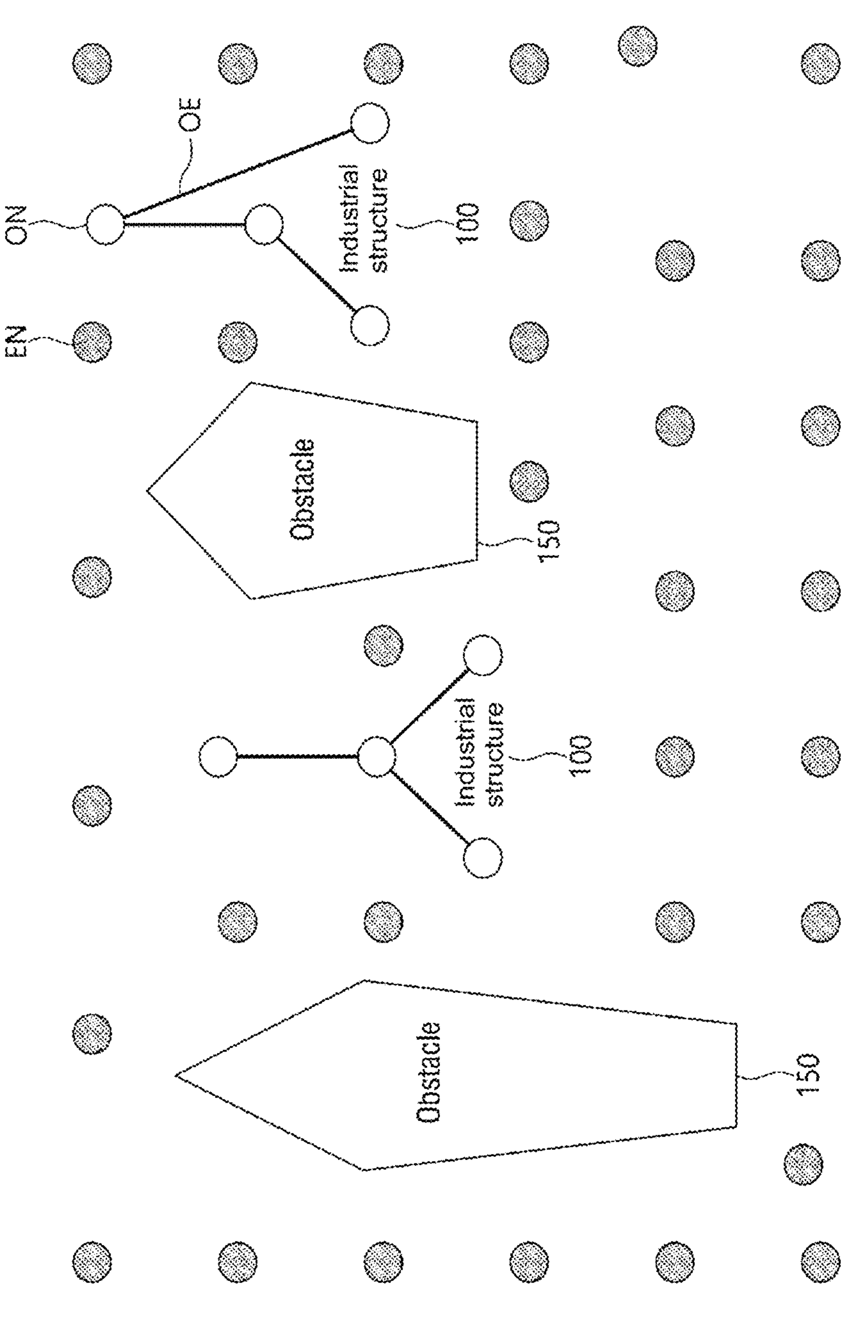
Figure 3C:
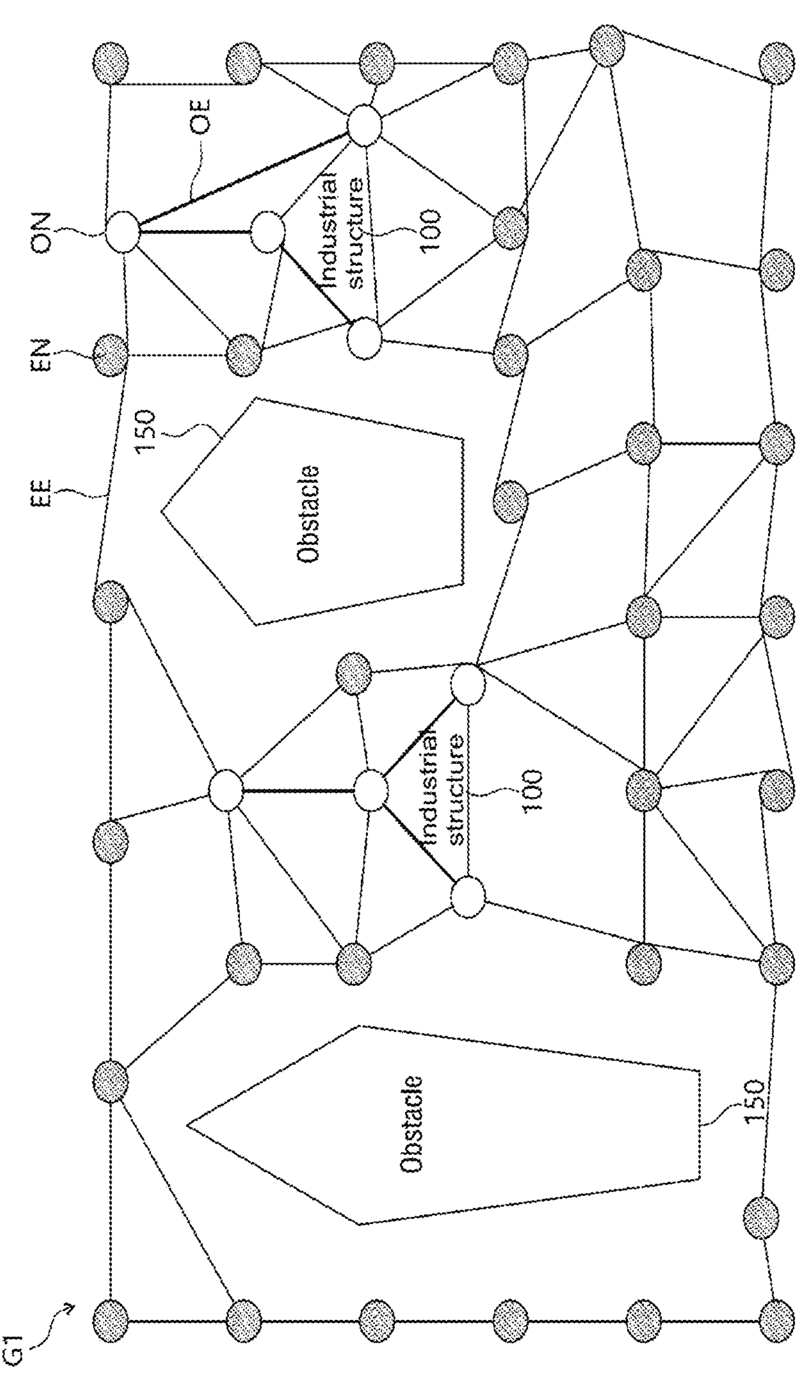

FIGS. 3*a* to 3*c* illustrate the process of generating the first graph according to some embodiments of the present invention.

Referring to FIGS. 2 and 3*a*, the first graph generation module 310 may determine and display the relative positions of the obstacle 150 and the industrial structure 100 based on the obstacle information and industrial structure information.

As an example, referring to FIG. 3*a*, the first graph generation module 310 may determine that the obstacle 150 and the industrial structure 100 intersect twice based on the obstacle information and industrial structure information, and then, the obstacle 150 and the industrial structure 100 may be displayed sequentially according to their determined relative positions.

Then, the first graph generation module 310 may set the nodes and edges for the industrial structure 100. In other words, the first graph generation module 310 may set the object nodes (hereinafter "ON") corresponding to the industrial structure 100 and the object edges (hereinafter "OE") connecting the object nodes ON.

For example, the first graph generation module 310 may set the object nodes ON and object edges OE based on the general shape of the industrial structure 100.

Specifically, the first graph generation module 310 may set the object nodes ON and object edges OE according to the type of industrial structure 100. In other words, depending on the type of industrial structure 100, the positions that the drone 200 must visit to perform inspections may vary, and the first graph generation module 310 may set the object nodes ON and object edges OE based on the type of industrial structure 100 and its general shape.

For example, assuming that the industrial structure 100 shown in FIG. 3*a* is a utility pole and a power line, the first graph generation module 310 may represent the utility pole of the industrial structure 100 as an object node ON and the power line connecting the poles as an object edge OE.

When setting the object nodes ON, the first graph generation module 310 may define the spatial information of each object node ON. At this time, the spatial information may include the latitude, longitude, and altitude of each node. In other words, the first graph generation module 310 may define the latitude, longitude, and altitude of each object node ON. However, the embodiments of the present invention are not limited to this.

When setting the object edges OE, the first graph generation module 310 may set the object edges OF based on the obstacle information. For example, the first graph generation module 310 may set the object edges OE such that at least a portion of the object edges OE is not included in the obstacle information corresponding to the obstacle 150.

In other words, the first graph generation module 310 may connect the object nodes ON as shown in FIG. 3*a* but may not set the edge PE, which passes through the obstacle 150, as an object edge OE.

FIG. 3*a* shows two industrial structures 100, and each industrial structure 100 includes four object nodes ON and three object edges OE, respectively, but the embodiments of the present invention are not limited to this.

Referring to FIGS. 2 and 3*b*, the first graph generation module 310 may then set the else nodes (hereinafter "EN") based on the obstacle information. In FIG. 3*b*, for the sake of explanation, the else nodes EN are shown as shaded nodes.

In some examples, the first graph generation module 310 may set the else nodes EN in areas excluding the obstacle information. In other words, when setting the else nodes EN, the first graph generation module 310 may set the else nodes EN such that they are not included in the obstacle information (e.g., obstacle location information).

At this time, when the first graph generation module 310 sets the else nodes EN, it may define the spatial information of each else node EN. In this case, the spatial information may include the latitude, longitude, and altitude of each node. In other words, the first graph generation module 310 may define the latitude, longitude, and altitude of each else node EN. However, the embodiments of the present invention are not limited to this.

Referring to FIGS. 2 and 3*c*, the first graph generation module 310 may then create the first graph G1 by setting the else edges (hereinafter "EE") that connect the nodes ON and EN based on the obstacle information.

In other words, the first graph generation module 310 may set the else edges EE connecting the object nodes ON, which were generated through the process described in FIG. 3*a*, and the else nodes EN, which were set through the process described in FIG. 3*b*, as well as the else edges EE connecting a plurality of else nodes EN.

At this time, when the first graph generation module 310 sets the else edges EE, it may set the else edges EE based on the obstacle information. For example, the first graph generation module 310 may set the else edges EE so that at least a portion of the else edge EE is not included in the obstacle information corresponding to the obstacle 150. In other words, the first graph generation module 310 may not set the edge PE, which passes through the obstacle 150 as shown in FIG. 3*a*, as else edge EE.

It is understood that the first graph G1 generated by the first graph generation module 310 is not limited to what is shown in FIG. 3*c*.

Referring again to FIG. 2, the second graph generation module 320 may generate a second graph based on the generated first graph.

In some examples, the second graph generation module 320 may generate the second graph related to selected inspection object edges among the plurality of edges included in the generated first graph. The process of generating the second graph will be explained in more detail with reference to FIGS. 4 to 5*d*.

Figure 4:
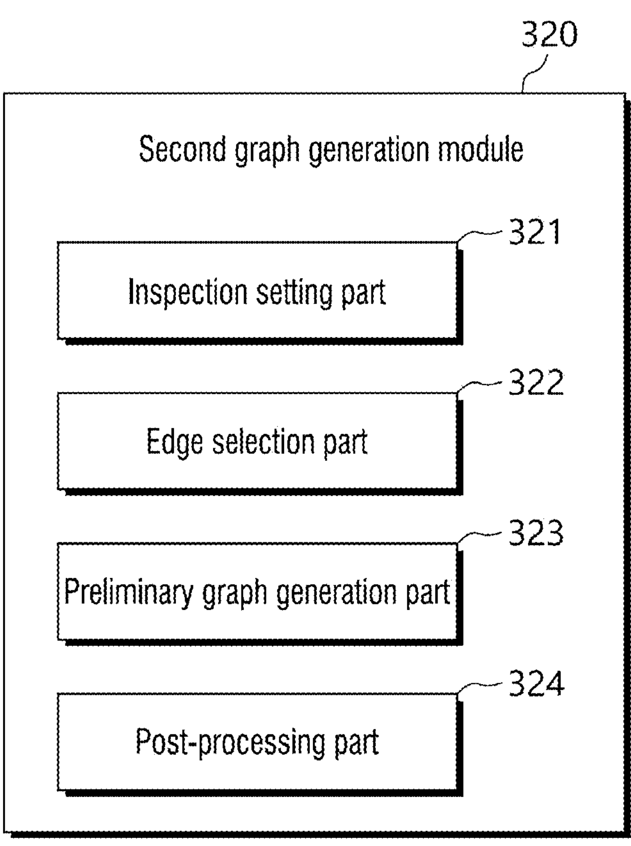
FIG. 4 is a detailed block diagram of the second graph generation module according to some embodiments of the present invention.

FIG. 4 is a detailed block diagram of the second graph generation module according to some embodiments of the present invention. FIGS. 5*a* to 5*d* illustrate the process of generating the second graph according to some embodiments of the present invention.

Referring to FIG. 4, the second graph generation module 320 may include an inspection setting part 321, an edge selection part 322, a preliminary graph generation part 323, and a post-processing part 324.

The inspection setting part 321 may set any two nodes among the plurality of nodes belonging to the first graph as the inspection start node and the inspection end node.

Figure 5A:
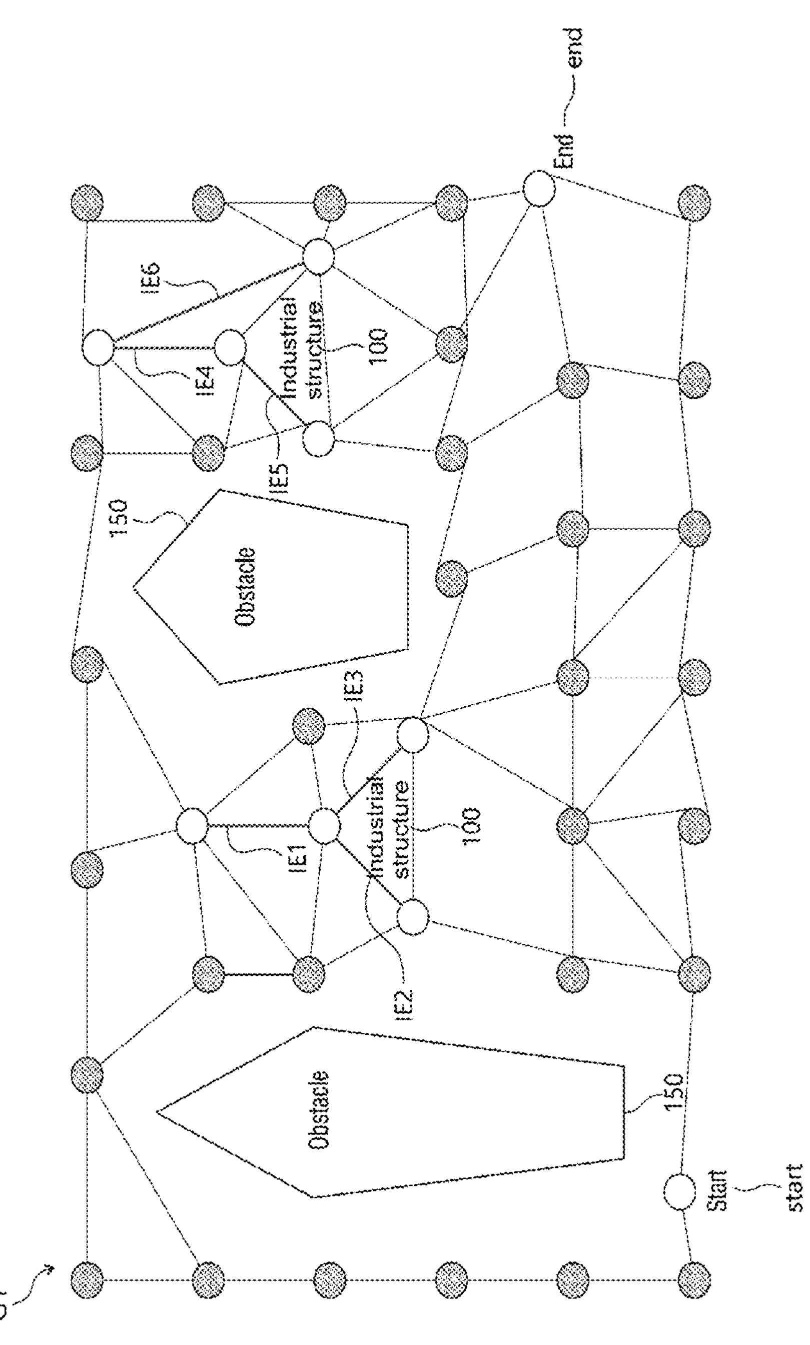

Referring to FIGS. 4 and 5*a*, the inspection setting part 321 may set any two nodes among the plurality of nodes belonging to the generated first graph G1 as the inspection start node (start) and the inspection end node (end).

In FIG. 5*a*, the inspection start node (start) and the inspection end node (end) are shown as different nodes, but the embodiments of the present invention are not limited to this. The inspection start node (start) and the inspection end node (end) may also be the same.

Unlike what is shown in FIG. 4, the inspection setting part 321 in the optimal path generation device 300 of the present invention may be omitted, in which case the inspection start node and inspection end node may be input by the administrator of the optimal path generation device 300 or may be pre-set nodes.

Referring again to FIG. 4, the edge selection part 322 may select the inspection object edges.

Referring to FIGS. 4 and 5*a*, the edge selection part 322 may select the inspection object edges IE1 to IE6. In FIG. 5*a*, for the convenience of explanation, the inspection object edges IE1 to IE6 are shown in red.

The edge selection part 322 may select the inspection object edges IE1 to IE6 among the plurality of edges of the first graph G1. In other words, the edge selection part 322 may select the inspection object edges IE1 to IE6 among the object edges and else edges included in the first graph G1 as described in FIGS. 3*a* to 3*c*.

In some examples, the edge selection part 322 may select the inspection object edges IE1 to IE6, as manually chosen by the administrator of the optimal path planning device 300 (as shown in FIGS. 1 and 2), or it may select the inspection object edges IE1 to IE6 by using a system that automatically selects different inspection object edges IE1 to IE6 at predetermined intervals.

FIG. 5*a* illustrates a case that all the object edges corresponding to the industrial structure 100 are selected as the inspection object edges IE1 to IE6. However, the embodiments of the present invention are not limited to this, and for example, the edge selection part 322 may select some of the object edges corresponding to the industrial structure 100 or some of the lese edges as inspection object edges IE1 to IE6.

In FIG. 5*a*, six inspection object edges IE1 to IE6 are selected, but it is understood that the embodiments of the present invention are not limited to this.

Figure 5B:
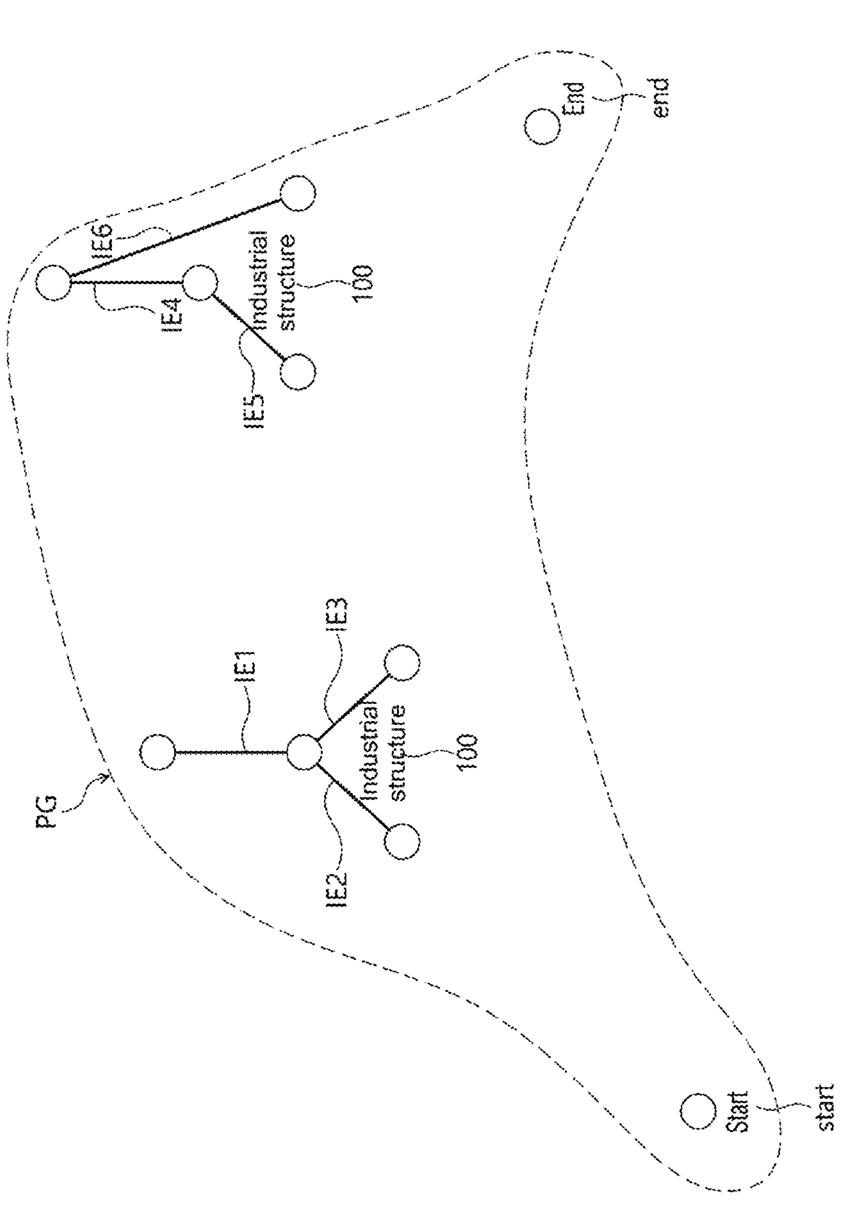

Referring to FIGS. 4 and 5*b*, the preliminary graph generation part 323 may generate a preliminary graph (hereinafter "PG") based on the selected inspection object edges IE1 to IE6.

The preliminary graph generation part 323 may generate the preliminary graph PG based on the inspection object edges IE1 to IE6 and the plurality of nodes corresponding to the inspection object edges IE1 to IE6. For example, referring to FIG. 5*b*, the preliminary graph generation part 323 may generate the preliminary graph PG to include the selected inspection object edges IE1 to IE6, the nodes corresponding to the inspection object edges IE1 to IE6, and the arbitrarily set inspection start node (start) and inspection end node (end).

At this time, the preliminary graph generation part 323 may generate the preliminary graph PG based on the first graph. For example, the preliminary graph generation part 323 may generate the preliminary graph PG so that the relative positions between the plurality of nodes corresponding to the selected inspection object edges IE1 to IE6 are the same as those in the first graph G1 (as shown in FIG. 5*a*).

Referring to FIGS. 4 and 5*a* to 5*c*, the post-processing part 324 may post-process the generated preliminary graph PG to generate the second graph G2.

Figure 5C:
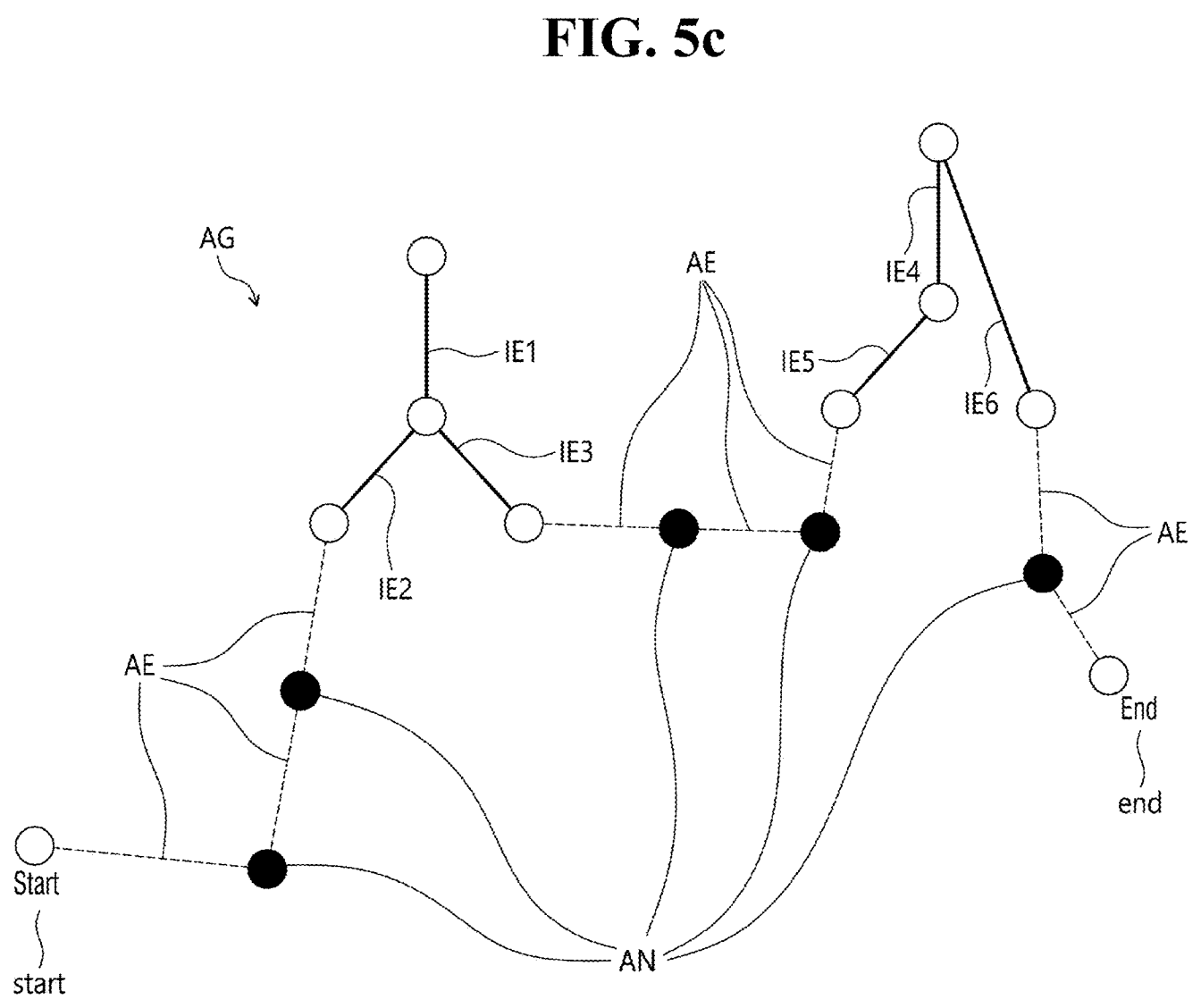
Figure 5D:
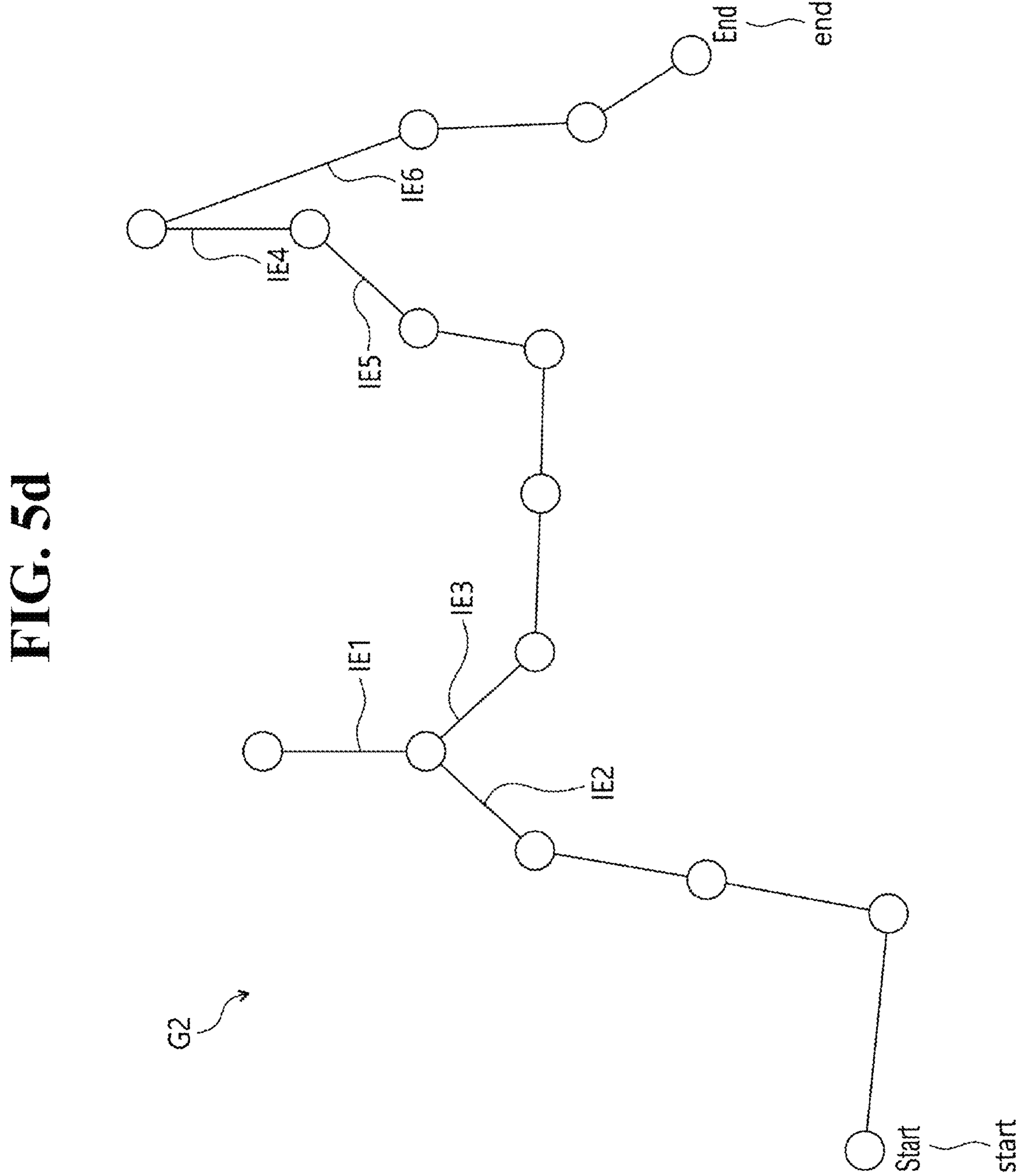

FIG. 5*c* illustrates the post-processing process of the post-processing part 324 through the generating process of an assistant graph (hereinafter "AG"), and FIG. 5*d* shows the second graph G2, which is the result of the post-processing.

The post-processing part 324 may post-process the generated preliminary graph PG into a connected graph by adding the minimum number of edges and determine the result of this post-processing as the second graph G2. In other words, the post-processing part 324 may post-process the preliminary graph PG by adding the minimum number of edges to form a connected graph and determine the post-processed preliminary graph as the second graph G2.

Generally, the preliminary graph PG generated through the process described in FIG. 5*b* is often in the form of an unconnected graph where the nodes are not fully connected. The post-processing part 324 may post-process this unconnected graph into a connected graph so that it sufficiently represents the movement path of the drone.

In some examples, the post-processing part 324 may generate an assistant graph AG based on the generated preliminary graph PG and then post-process the preliminary graph PG into a connected graph based on the generated assistant graph AG. Some examples of the generated assistant graph AG are shown in FIG. 5*c*.

Specifically, in a first step, the post-processing part 324 may add each node of the preliminary graph PG to the assistant graph AG whose initial state is in the form of an empty graph.

In a second step, the post-processing part 324 may set the edges present in the preliminary graph PG, i.e., the inspection object edges IE1 to IE6, as edges with a cost of zero in the assistant graph AG.

The form of the assistant graph on which the first and second steps are performed may mean the same form of the preliminary graph PG in FIG. 5*b*, except for the cost information.

In a third step, the post-processing part 324 may, for every pair of nodes in the auxiliary graph AG, establish an auxiliary node AN and an auxiliary edge AE connecting those nodes based on the generated first graph G1 if the edge connecting the two nodes in each pair does not exist in the assistant graph AG.

In some examples, the post-processing part 324 may identify the shortest path between the unconnected two nodes in the first graph G1 and add the identified shortest path to the assistant graph AG. For example, the post-processing part 324 may set the nodes and edges corresponding to the identified shortest path as auxiliary nodes AN and auxiliary edges AE in the assistant graph AG, respectively.

At this time, the post-processing part 324 may identify the shortest path between those two nodes in the first graph G1 using a predetermined algorithm. The predetermined algorithm may include Dijkstra's algorithm, A* search algorithm, and the like, but the embodiments of the present invention are not limited to these.

For example, as shown in FIG. 5*b*, edges connecting the inspection start node (start) and one of the nodes of the industrial structure 100, edges connecting two industrial structures 100, and edges connecting the inspection end node (end) and one of the nodes of the industrial structure 100 do not exist in the preliminary graph PG.

In this case, the post-processing part 324 may set auxiliary nodes AN and auxiliary edges AE corresponding to the shortest path between the unconnected nodes in the assistant graph AG, referring to the first graph G1, as shown in FIG. 5*c*. In FIG. 5*c*, for the convenience of explanation, the auxiliary nodes AN are represented as black nodes, and the auxiliary edges AE are represented as dotted lines.

In a fourth step, the post-processing part 324 may obtain a minimum spanning tree for the assistant graph AG generated through the aforementioned process and, based on the obtained minimum spanning tree, finally generate the second graph G2.

For example, the post-processing part 324 may generate the second graph G2 by adding all the nodes present in the assistant graph AG and the edges corresponding to the minimum spanning tree of the assistant graph AG to the preliminary graph PG without duplication. In some cases, there may be unnecessary and inefficient edge connections between nodes, but by using the minimum spanning tree to find the minimum connection, such unnecessary edge connections may be minimized.

The second graph G2 generated through the post-processing process into a connected graph is shown in FIG. 5*d*, but it is understood that the shape of the second graph G2 of the present invention is not limited to what is shown.

Referring again to FIG. 2, the third graph generation module 330 may generate the third graph with an Eulerian path based on the generated second graph.

An Eulerian path may refer to a path where every edge is traversed exactly once, starting from the inspection start node and reaching the inspection end node. An Eulerian path may be formed if the degrees of the inspection start node and the inspection end node are odd, while the degrees of all other nodes are even. Here, the degree refers to the number of edges connected to a node. If the inspection start node and the inspection end node are the same, it may be referred to as an Eulerian circle, which may be formed when the degree of all nodes is even.

In other words, if the inspection start node and the inspection end node are the same, the third graph generated by the third graph generation module 330 may be in the form of an Eulerian circle. If the inspection start node and the inspection end node are different, the third graph generated by the third graph generation module 330 may be in the form of an Eulerian path.

In some examples, the third graph generation module 330 may generate the third graph with an Eulerian path by adding the minimum number of edges to the generated second graph. In other words, the third graph generation module 330 may add the minimum number of edges to the generated second graph so that it has an Eulerian path, and the result of adding the minimum number of edges may be determined as the third graph.

Hereinafter, the third graph will be explained in detail with reference to FIGS. 6 to 8.

Figure 6:
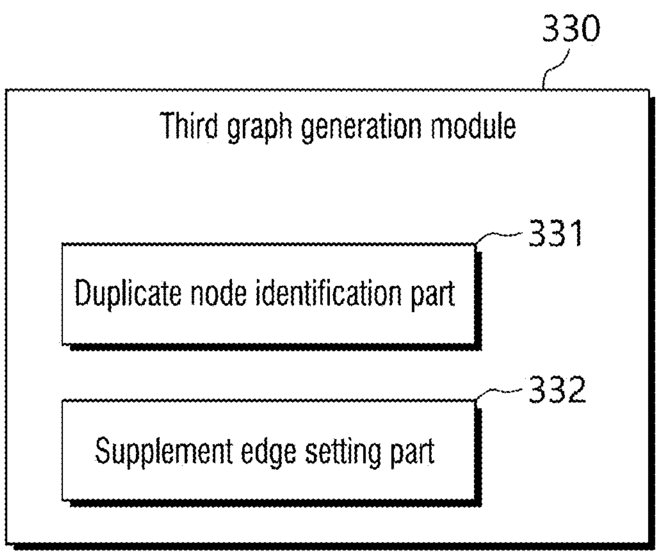
FIG. 6 is a detailed block diagram of the third graph generation module according to some embodiments of the present invention.
Figure 7A:
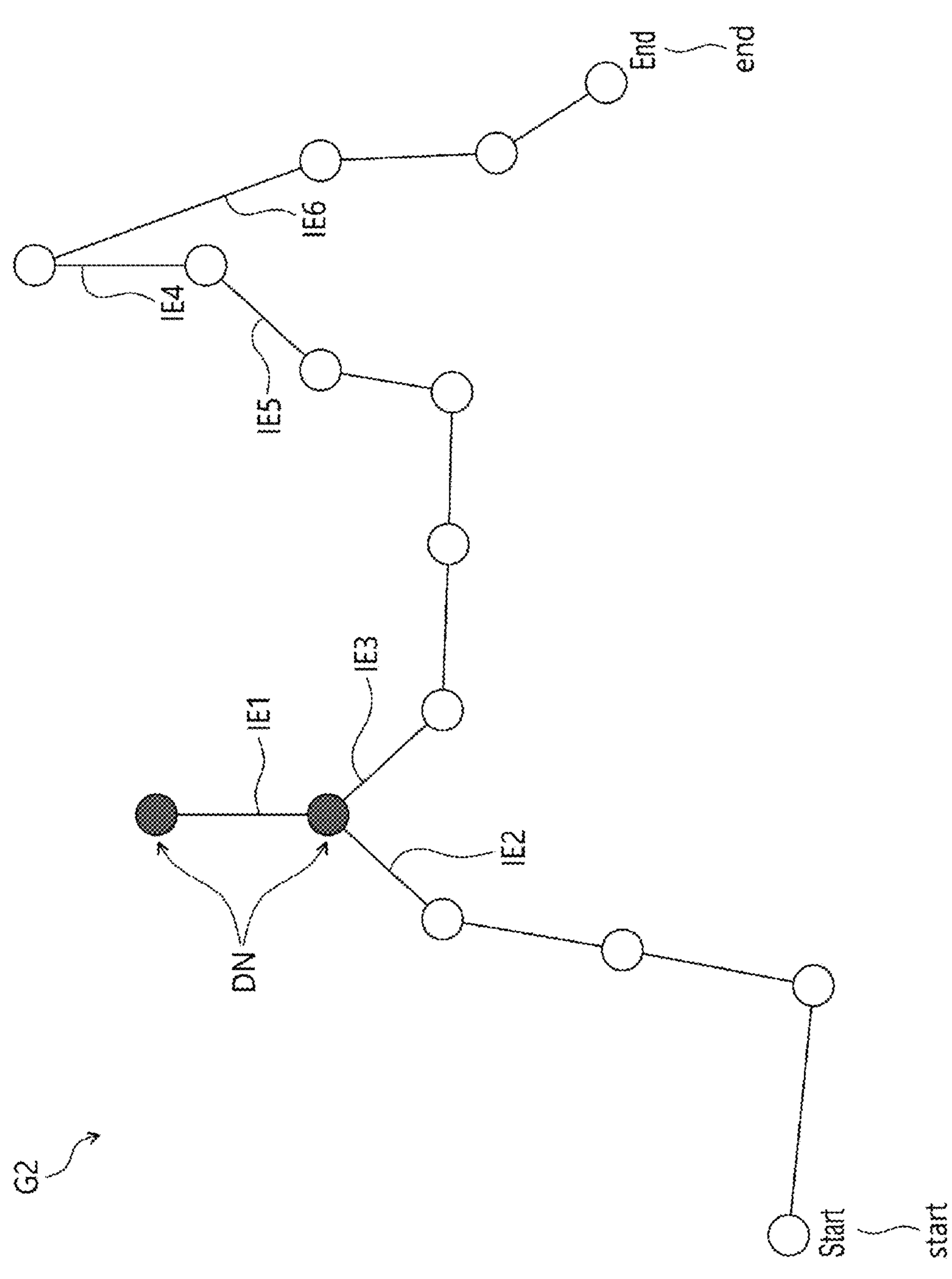
FIGS. 7*a* and 7*b* illustrate the process of generating the third graph according to some embodiments of the present invention.
Figure 7B:
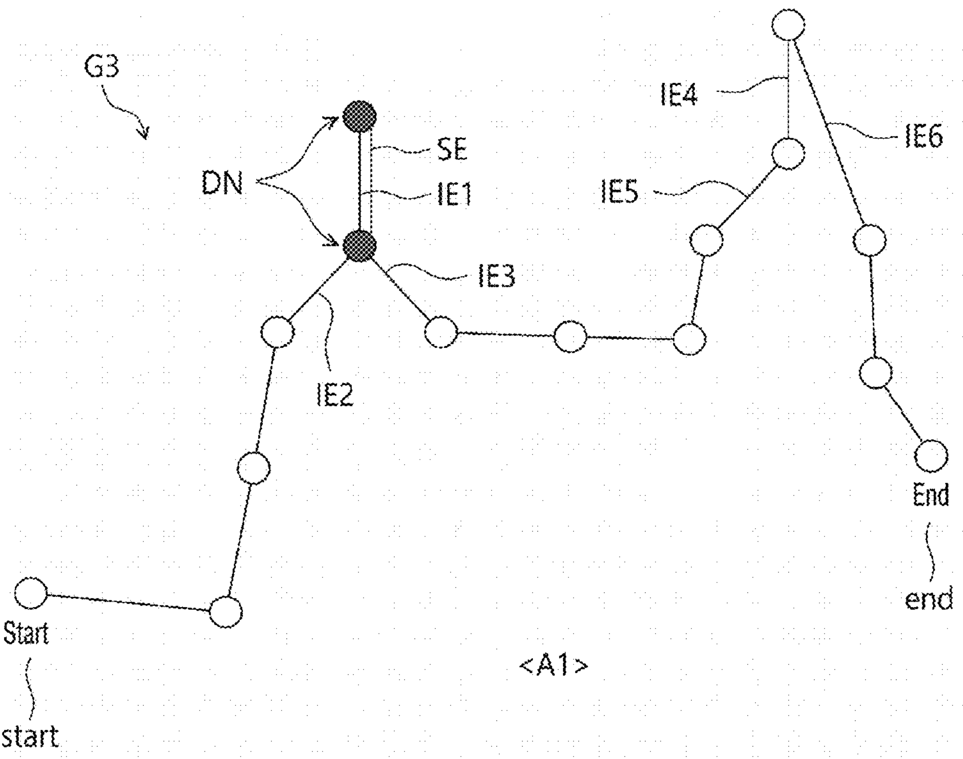
Figure 7B:
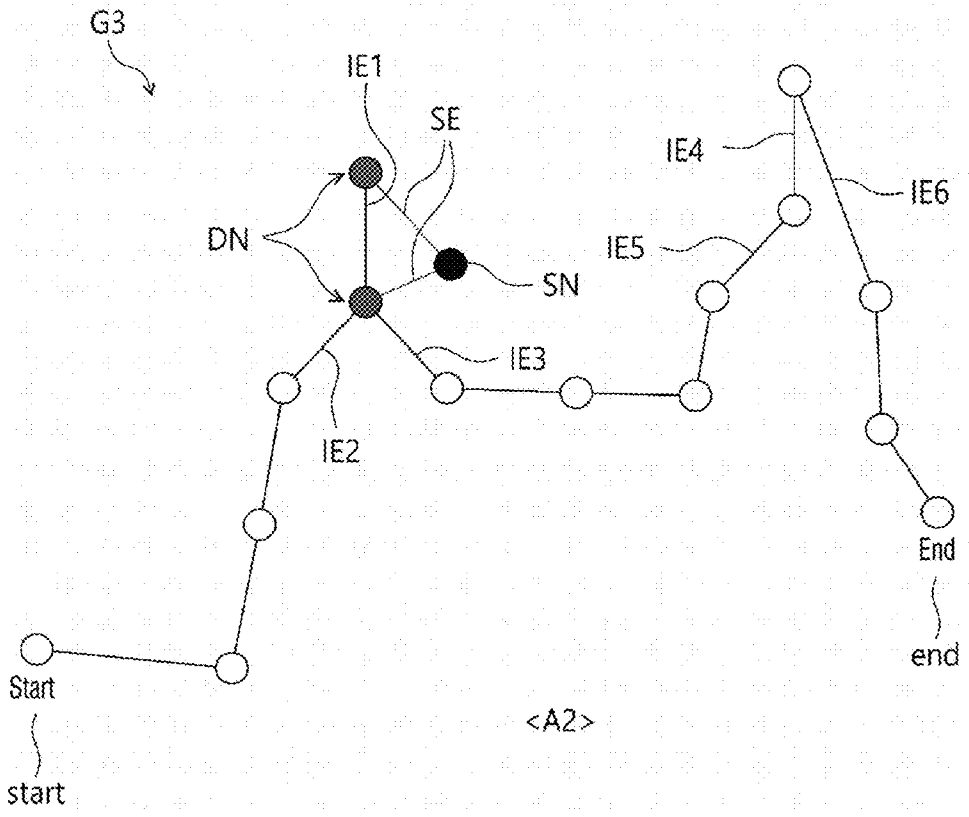

FIG. 6 is a detailed block diagram of the third graph generation module according to some embodiments of the present invention. FIGS. 7*a* and 7*b* illustrate the process of generating the third graph according to some embodiments of the present invention. FIG. 8 illustrates the third graph and the movement path of the drone in the third graph according to some embodiments of the present invention.

Referring to FIG. 6, the third graph generation module 330 may generate the third graph with an Eulerian path based on the second graph and may specifically include a duplicate node identification part 331 and a supplement edge setting part 332.

Referring to FIGS. 6 and 7*a*, the duplicate node identification part 331 may identify duplicate nodes DN in the second graph G2.

In other words, the duplicate node identification part 331 may identify, among the nodes in the second graph G2, duplicate nodes (hereinafter "DN") that do not satisfy the Eulerian path conditions described above.

The Eulerian path conditions mean that the degrees of the inspection start node and inspection end node are odd, and the degrees of all other nodes are even, as described earlier. Here, the degree refers to the number of edges connected to a node.

For example, referring to FIG. 7*a*, the duplicate node identification part 331 may identify nodes with odd degrees, other than the inspection start node (start) and the inspection end node (end), as duplicate nodes DN.

In FIG. 7*a*, for the sake of explanation, the duplicate nodes identified by the duplicate node identification part 331 are shown as red nodes.

Referring to FIGS. 6 and 7*b*, the supplement edge setting part 332 may generate the third graph G3 with an Eulerian path based on the identified duplicate nodes DN.

In some examples, the supplement edge setting part 332 may set the supplement edges SE that connect the duplicate nodes DN identified in the second graph and determine the result of setting the supplement edges SE as the third graph G3.

At this time, the supplement edge setting part 332 may generate the third graph G3 with an Eulerian path by adding the minimum number of edges to the second graph. In other words, the supplement edge setting part 332 may set the minimum number of supplement edges SE to ensure that the generated second graph has an Eulerian path, and the result of setting the minimum supplement edges SE may be determined as the third graph G3.

For example, the supplement edge setting part 332 may search for the shortest path between the duplicate nodes DN in the first graph, and based on the shortest path between the searched duplicate nodes DN, set the supplement edges SE in the second graph to generate the third graph G3 with the minimum supplement edges SE.

At this time, the supplement edge setting part 332 may search for the shortest path by searching and utilizing the cost information of each edge in the first graph. For example, the supplement edge setting part 332 may search for the shortest path between the duplicate nodes DN in the first graph using a predetermined algorithm. The predetermined algorithm may include Dijkstra's algorithm, A* search algorithm, and the like, but the embodiments of the present invention are not limited to these.

In <A1> and <A2> of FIG. 7*b*, two cases of the third graph G3 generated by the supplement edge setting part 332 by setting supplement edges SE in the second graph are shown.

<A1> of FIG. 7*b* illustrates the case where the supplement edge setting part 332 sets supplement edges SE that directly connect between the duplicate nodes DN, while <A2> of FIG. 7*b* illustrates the case where the supplement edge setting part 332 does not directly connect between the duplicate nodes DN, but instead sets supplement nodes SN and sets supplement edges SE between the supplement nodes SN and each duplicate node DN. For the sake of explanation, in <A1> of FIG. 7*b*, the supplement edges SE are shown in blue edges, and in <A2> of FIG. 7*b*, the supplement nodes SN are shown as black nodes, and the supplement edges SE are shown as blue edges.

In other words, in the case of <A2> of FIG. 7*b*, it indicates that the cost information for the edge connecting between the duplicate nodes DN is high, so passing through the edge connecting between the duplicate nodes DN twice (as shown in <A1> of FIG. 7*b*) is not the shortest path.

Whether the result of setting the supplement edges SE in <A1> or <A2> of FIG. 7*b* has lower cost information may only be determined by knowing the actual cost information of the first graph. Therefore, for the convenience of explanation, the case of <A1> in FIG. 7*b* will be assumed to reflect the shortest path between the duplicate nodes DN in the first graph.

Additionally, if there are more than two duplicate nodes DN, as opposed to the case shown in FIG. 7*b*, the supplement edge setting part 332 may apply the minimum weight matching technique to the cost information corresponding to the edges connecting the three or more duplicate nodes DN, thereby determining pairs of duplicate nodes corresponding to the minimum weight matching. In this case, the supplement edge setting part 332 may set supplement edges based on the shortest path in the first graph corresponding to the determined pairs of duplicate nodes.

Figure 8:
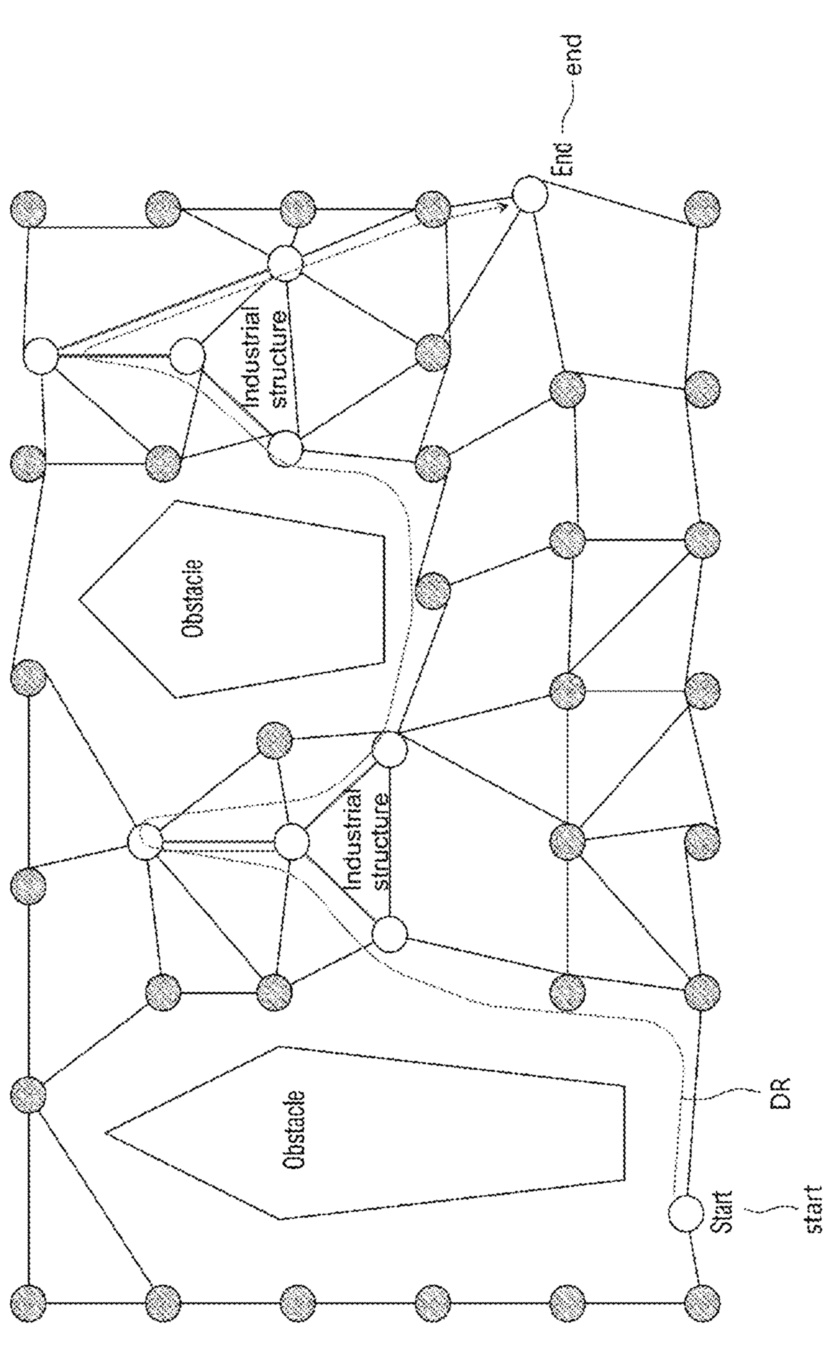
FIG. 8 illustrates the third graph and the movement path of the drone in the third graph according to some embodiments of the present invention.

Referring to FIG. 8, the movement path of the drone (drone route, hereinafter "DR") based on the generated third graph is shown.

The drone route DR may include the movement path from the preset inspection start node (start) to the inspection end node (end), as described above.

The blue edges shown in FIG. 8 represent the supplement edges set through the process of <A1> in FIG. 7*b*. This is the result of assuming that the drone route DR shown in FIG. 8 is the case where <A1> of FIG. 7*b* reflects the shortest path between the duplicate nodes DN in the first graph, as described above. The drone may be interpreted as passing twice between the nodes where supplement edges are set.

Referring again to FIG. 2, the final path determination module 340 may determine the optimal path of the drone.

In some examples, the final path determination module 340 may determine the optimal path of the drone based on the total cost of each of the plurality of third graphs generated by setting different inspection start and end nodes. The total cost may refer to the sum of the cost information of all the edges in the third graph.

Specifically, the final path determination module 340 may first control the inspection setting part 321 of the second graph generation module 320 (as shown in FIG. 4) to generate the plurality of third graphs where the inspection start and/or end nodes are set differently. In other words, the final path determination module 340 may control other components of the optimal path planning device so that the plurality of third graphs are generated with at least one of the inspection start node and the inspection end node set differently.

Then, the final path determination module 340 may determine the optimal path of the drone based on the total cost of each of the generated third graphs.

For example, the final path determination module 340 may compare the total cost of the plurality of third graphs generated with at least one of the inspection start and end nodes set differently and determine the drone route in the third graph with the minimum total cost as the optimal path of the drone.

At this time, the total cost may refer to the sum of the cost information of all the edges in the third graph. As described above, the edges may include cost information related to the movement of the drone between the corresponding two nodes, and the cost information may refer to the length of the edge connecting the corresponding two nodes, the movement time required for the drone to fly between the corresponding nodes, and the like.

In summary, the final path determination module 340 may control the inspection setting part 321 (as shown in FIG. 4) to set the inspection start and end nodes, ensuring that at least one of the inspection start node and inspection end node is set differently each time, and the final path determination module 340 may then determine the optimal path of the drone by comparing the total cost of the plurality of third graphs generated for each of these settings.

Once the optimal path of the drone is determined through the aforementioned process, the final path determination module 340 may determine the inspection start node and inspection end node corresponding to the determined optimal path as the optimal station locations.

In other words, the optimal path of the drone 200 (as shown inn FIG. 1) generated by the final path determination module 340 of the present invention automatically determines not only the path for approaching and inspecting the industrial structure 100 (as shown in FIG. 1), but also the optimized locations of the departure station from which the drone 200 starts its flight and the return station to which the drone 200 returns.

Through this, the path planning device 300 of the present invention has the novel effect of additionally determining the optimal station locations for the departure of the drone and return points.

Figure 9:
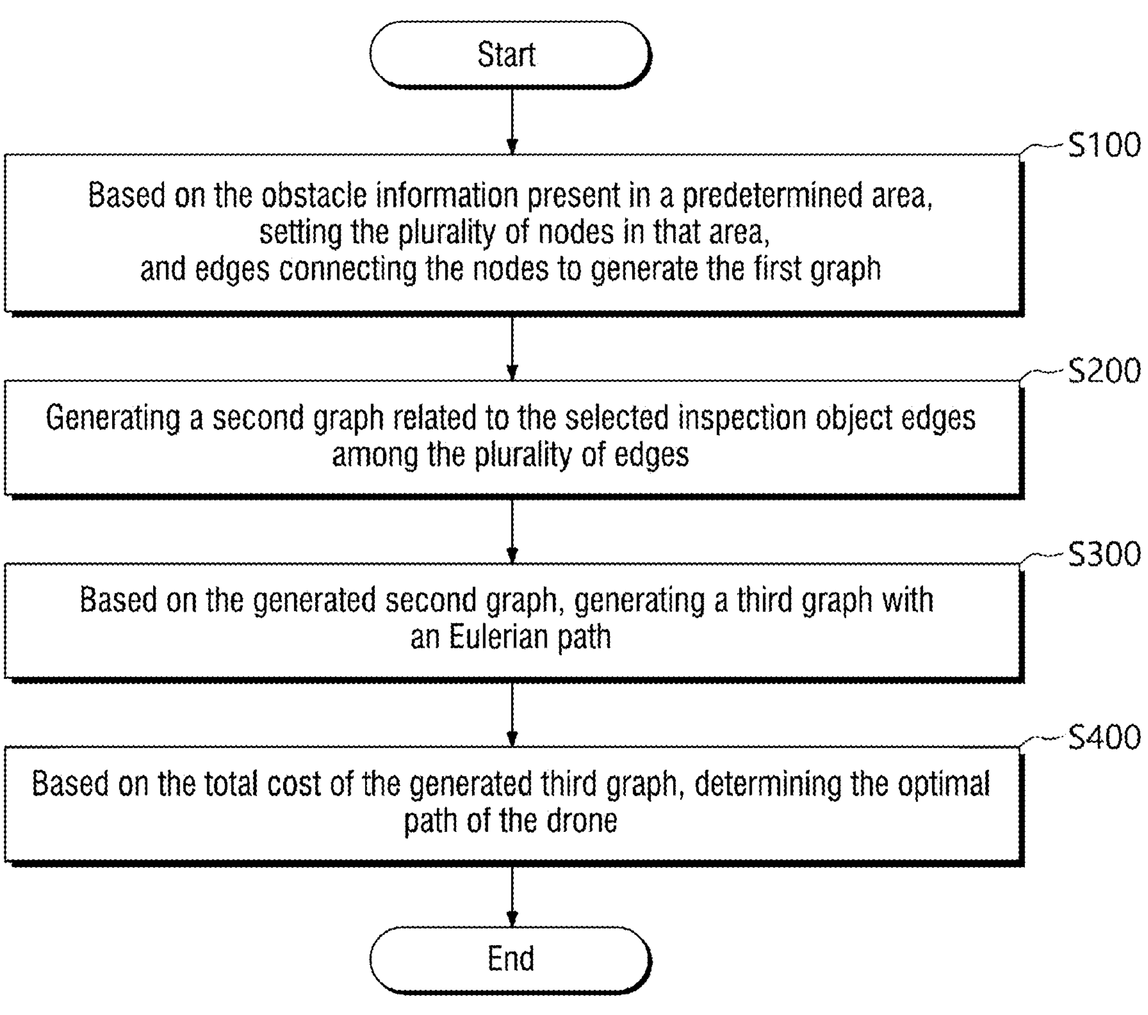
FIG. 9 is a flowchart of the optimal path planning method according to some embodiments of the present invention.

FIG. 9 is a flowchart of the optimal path planning method according to some embodiments of the present invention.

Each step (S100 to S400) in FIG. 9 may be performed by the optimal path planning device 300 shown in FIGS. 1 and 2. The following description briefly explains the process, omitting redundant details.

First, based on the obstacle information present in a predetermined area, the plurality of nodes may be set in that area, and edges connecting the nodes may be established to generate the first graph (S100).

In some examples, the first graph may be generated based on obstacle information and industrial structure information present in the predetermined area.

The obstacle information may include topographical information about restricted areas where obstacles exist, preventing the drone from passing, and the industrial structure information may include topographical information about industrial structures. This topographical information may include at least one of location information and altitude information. In other words, the obstacle information may include location information, altitude information, and the like for restricted areas, while the industrial structure information may include location information, altitude information, and the like for industrial structures.

For example, the first graph may be generated by setting the plurality of nodes and edges in the area based on obstacle information and industrial structure information for the predetermined area.

At this time, the spatial information of each node may be defined. The spatial information may include the latitude, longitude, and altitude of each node, but the embodiments of the present invention are not limited to this.

At this time, the nodes and edges may be set so as not to overlap with the obstacle information. In other words, the nodes and edges may be set to be excluded from the obstacle information.

Detailed explanations are omitted.

Next, a second graph related to the selected inspection object edges among the plurality of edges may be generated (S200).

In some examples, the optimal path generation device 300 (as shown in FIGS. 1 and 2) of the present invention may generate a second graph related to the selected inspection object edges among the plurality of edges included in the generated first graph.

At this time, during the generation of the second graph, processes such as setting the inspection start and end nodes, selecting the inspection object edges, generating the preliminary graph, and post-processing to convert it into a connected graph may be performed.

The post-processing process may be performed by processes such as generating an assistant graph and adding the generated assistant graph to the preliminary graph without duplication.

Detailed explanations are omitted.

Next, based on the generated second graph, a third graph with an Eulerian path may be generated (S300).

In some examples, the third graph with an Eulerian path may be generated by adding the minimum number of edges to the previously generated second graph. In other words, the optimal path generation device 300 (as shown in FIGS. 1 and 2) of the present invention may add the minimum number of edges to the generated second graph such that the generated second graph has an Eulerian path, and may determine that the result of adding the minimum number of edges is the third graph.

The process of generating the third graph may include processes such as identifying duplicate nodes and setting supplement edges related to the identified duplicate nodes. At this time, the supplement edges may be set based on the shortest path between the duplicate nodes in the first graph.

Detailed explanations are omitted.

Next, based on the total cost of the generated third graph, the optimal path of the drone may be determined (S400).

In some examples, the optimal path generation device 300 (as shown in FIGS. 1 and 2) of the present invention may control the inspection setting part 321 (as shown in FIG. 4) to set the inspection start node and inspection end node such that at least one of them is set differently each time, and by comparing the total cost of the plurality of third graphs generated from these settings, the optimal path of the drone may be determined.

At this time, the total cost may refer to the sum of the cost information of all the edges in the third graph. At this time, as described above, the edges may include cost information related to the movement of the drone between the corresponding two nodes, and the cost information may refer to the length of the edge connecting the corresponding two nodes or the movement time required for the drone to fly between the corresponding nodes.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. An optimal path planning method for drones, comprising:

generating a first graph by setting a plurality of nodes in a predetermined area based on obstacle information and industrial structure information related to a drone route for the predetermined area, and by setting a plurality of edges that connect each of the nodes;

generating a second graph related to selected inspection object edges among the plurality of edges; and generating a third graph with an Eulerian path based on the generated second graph, wherein the industrial structure information includes topographical information of industrial structures to be inspected by the drone, and wherein the drones fly based on commands derived from the optimal path planning method.

2. The optimal path planning method for drones of claim 1, wherein the edges include cost information related to the movement of the drone between the corresponding two nodes forming each edge.

3. The optimal path planning method for drones of claim 2, wherein the cost information includes at least one of edge lengths connecting the corresponding nodes and a movement time of the drone between the corresponding nodes.

4. The optimal path planning method for drones of claim 1, wherein the obstacle information includes topographical information of restricted areas where the drone cannot pass.

5. The optimal path planning method for drones of claim 4, further comprising:

setting the plurality of nodes so that they are not included in the obstacle information when setting the plurality of nodes, and setting the edges so that at least a portion of the edges is not included in the obstacle information when setting the edges.

6. The optimal path planning method for drones of claim 5, further comprising:

defining spatial information of each node when setting the nodes, wherein the spatial information includes at least one of the latitude, longitude, and altitude of each of the nodes.

7. The optimal path planning method for drones of claim 1, further comprising:

setting an inspection start node and an inspection end node from among the plurality of nodes in the generated first graph;

selecting inspection object edges from among the plurality of edges in the first graph;

generating a preliminary graph including the inspection object edges and the nodes corresponding to the inspection object edges; and post-processing the preliminary graph into a connected graph and determining the post-processed preliminary graph as the second graph.

8. The optimal path planning method for drones of claim 7, further comprising:

generating an assistant graph based on the generated preliminary graph, and post-processing the preliminary graph into the connected graph by adding the nodes and edges in the generated assistant graph to the preliminary graph without duplication.

9. The optimal path planning method for drones of claim 8, further comprising:

adding nodes and edges present in the preliminary graph to the assistant graph, which initially starts as an empty graph, and for all pairs of nodes in the assistant graph, if an edge connecting the two nodes does not exist in the assistant graph, setting auxiliary nodes and auxiliary edges in the assistant graph to connect the two nodes based on the first graph, wherein the auxiliary nodes and auxiliary edges are set in the assistant graph based on the shortest path between the two nodes identified in the first graph.

10. The optimal path planning method for drones of claim 1, further comprising:

identifying duplicate nodes among the nodes of the second graph that do not satisfy predetermined Eulerian path conditions, and setting supplement edges connecting the identified duplicate nodes and determining the second graph with the set supplement edges as the third graph.

11. The optimal path planning method for drones of claim 10, further comprising:

setting the supplement edges based on the shortest path between the duplicate nodes searched in the first graph.

12. The optimal path planning method for drones of claim 2, further comprising:

determining the optimal path of the drone based on the total cost of the generated third graph.

13. The optimal path planning method for drones of claim 12, further comprising:

comparing total costs of a plurality of third graphs generated by setting at least one of the inspection start node and the inspection end node differently, and determining a third graph with a minimum total cost as the optimal path of the drone, wherein the total cost of the third graph is a sum of cost information corresponding to all the edges included in the third graph.

* * * * *